United States Patent
Sopel et al.

(10) Patent No.: US 9,969,431 B2
(45) Date of Patent: May 15, 2018

(54) DOUBLE ANGLED RAIL SYSTEM FOR A VEHICLE

(71) Applicants: Grzegorz Sopel, Windsor (CA); Rajkumar Rajagopalan, Troy, MI (US); Joseph V Rozenbaum, Ortonville, MI (US); Hassan H El-Hor, Ann Arbor, MI (US); Rebecca L Tanguay, Troy, MI (US); Zheng Qin, Troy, MI (US); Michael Dreer, Rochester, MI (US); Shakti P Chavan, Auburn Hills, MI (US); Venkata Vinod Pasumarthi, Troy, MI (US)

(72) Inventors: Grzegorz Sopel, Windsor (CA); Rajkumar Rajagopalan, Troy, MI (US); Joseph V Rozenbaum, Ortonville, MI (US); Hassan H El-Hor, Ann Arbor, MI (US); Rebecca L Tanguay, Troy, MI (US); Zheng Qin, Troy, MI (US); Michael Dreer, Rochester, MI (US); Shakti P Chavan, Auburn Hills, MI (US); Venkata Vinod Pasumarthi, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days. days.

(21) Appl. No.: 15/233,483

(22) Filed: Aug. 10, 2016

(65) Prior Publication Data
US 2018/0043937 A1    Feb. 15, 2018

(51) Int. Cl.
B62D 21/15    (2006.01)
B62D 21/02    (2006.01)
B60R 19/32    (2006.01)

(52) U.S. Cl.
CPC ............ B62D 21/152 (2013.01); B60R 19/32 (2013.01); B62D 21/02 (2013.01)

(58) Field of Classification Search
CPC ........ B62D 21/152; B62D 21/02; B60R 19/32
USPC .................................................. 296/187.09
See application file for complete search history.

(56) References Cited

U.S. PATENT DOCUMENTS

| 8,991,544 B1* | 3/2015 | Stratten | .................. B60R 19/04 180/274 |
| 2014/0265442 A1* | 9/2014 | Makino | ................ B62D 21/155 296/187.1 |

* cited by examiner

*Primary Examiner* — Joseph D. Pape
*Assistant Examiner* — Dana D Ivey
(74) *Attorney, Agent, or Firm* — Ralph E Smith

(57) ABSTRACT

In at least one implementation, a structural rail for a vehicle includes a main body and a front portion. The main body has an upper wall, a lower wall, an inner sidewall and an outer sidewall spaced from the inner sidewall. The front portion has a rear end adjacent to the second end of the main body and a front end spaced from the rear end. The main body has a first bend between the first end and second end so that a portion of the main body is angled outwardly and an included angle of less than 180 degrees is provided in the outer sidewall. The rail also includes a second bend between the first bend and the front end, and the second bend further angles at least part of the front portion outwardly relative to the outwardly angled portion of the main body.

16 Claims, 4 Drawing Sheets

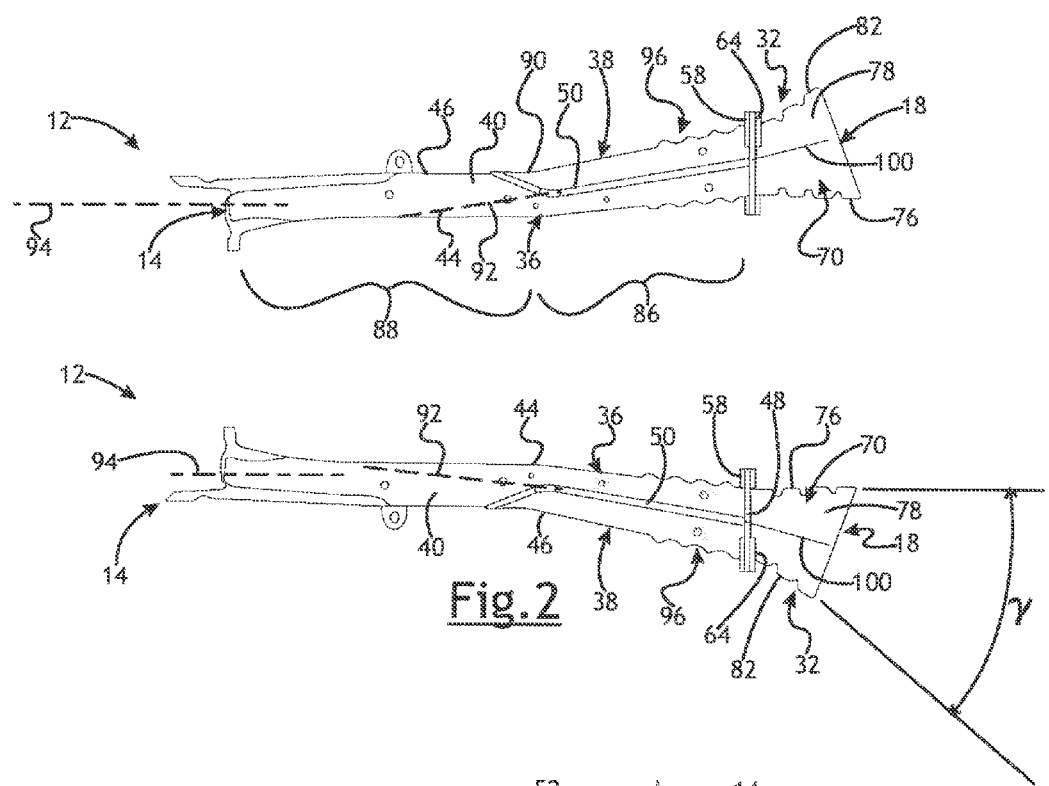
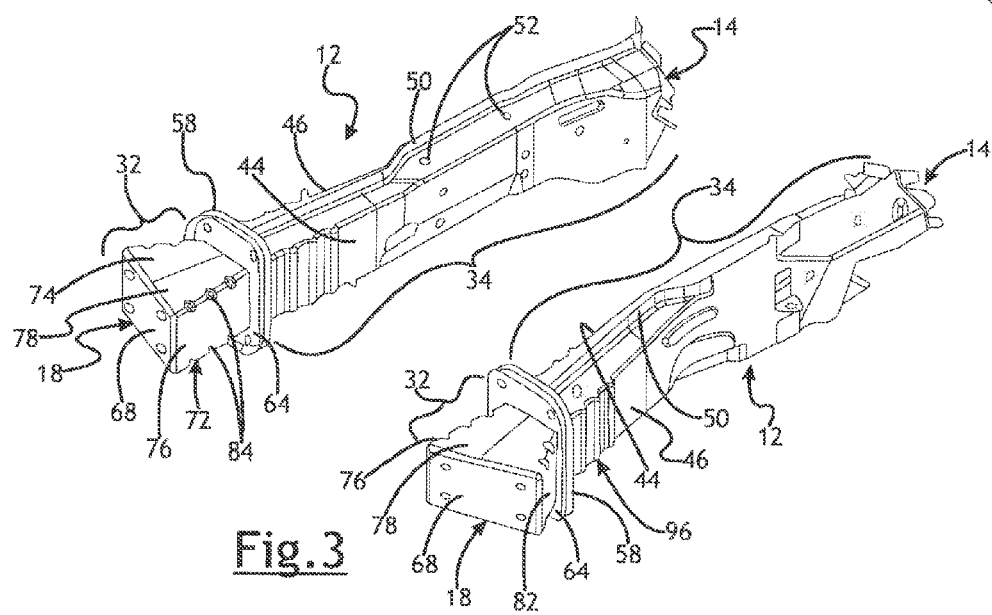

DOUBLE ANGLED RAIL SYSTEM FOR A VEHICLE

FIELD

The present disclosure relates to one or more angled rails for a vehicle structural assembly.

BACKGROUND

Automotive vehicles may include a structural assembly including one or more rails extending rearwardly from a front bumper. The rails provide structure to which various vehicle components can be mounted, such as the front bumper and the vehicle engine. The rails have been arranged in a straight forward and rearward orientation relative to the vehicle, without deviation in a cross-car direction. This arrangement provides minimal spacing between the ends of the rails connected to the front bumper and so the rails are not directly engaged or involved in at least some vehicle collisions with objects significantly offset from a center of the front bumper.

SUMMARY

In at least one implementation, a structural rail for a vehicle includes a main body and a front portion. The main body has a first end and a second end and a longitudinal length between the first end and the second end. An upper wall extends between the first end and the second end, a lower wall extends between the first end and the second end, an inner sidewall extends between the upper wall and the lower wall, and an outer sidewall extends between the upper wall and the lower wall and laterally spaced from the inner sidewall. The front portion has a rear end adjacent to the second end of the main body and a front end longitudinally spaced from the rear end. The main body has a first bend between the first end and second end so that the main body between the first bend and the front end is angled outwardly and an included angle of less than 180 degrees is provided in the outer sidewall. The rail also includes a second bend between the first bend and the front end, and the second bend further angles at least part of the front portion outwardly relative to the outwardly angled portion of the main body.

In at least some implementations, the front portion includes an inner sidewall generally aligned within the inner sidewall of the main body, and the front portion includes an outer sidewall generally aligned with the outer sidewall of the second body, and wherein the second bend defines an included angle of less than 180 degrees between the outer sidewall of the front portion and the outer sidewall of the main body. The front portion may be tapered so that the front portion has a greater cross-sectional area at the front end than at the rear end, to provide an enlarged front portion in the area of a vehicle front bumper, when assembled in the vehicle.

In at least some implementations, the main body includes an inboard portion defining the inner sidewall, and an outboard portion defining the outer sidewall, and the inboard portion and outboard portion are coupled together at a junction that extends along a center of the main body between the bend and the second end of the main body. The junction may include an upstanding flange and the inboard portion and outboard portion may be welded at the flange.

In at least some implementations, a structural assembly for a vehicle having an engine within an engine compartment and a wheel within a wheel well, includes a main body and a crush can. The main body has a rear end adapted to be coupled to a vehicle structural member and a front end adapted to be coupled to a vehicle bumper, the main body being hollow and having an inboard side that extends along the engine compartment of the vehicle and an outboard side that extends along the vehicle wheel well, the inboard side and the outboard side being defined in separate pieces of material that are connected together. The crush can is adjacent to the front end of the main body. The main body has a first bend between the front end and rear end so that the main body between the first bend and the front end is angled outwardly away from the engine compartment, and the rail has a second bend between the first bend and the front end. The second bend further angles at least part of the crush can outwardly away from the engine compartment.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

BRIEF DESCRIPTION OF THE DRAWINGS

FIG. 2 is a top view of the rails of FIG. 1;

FIG. 3 is a front perspective view of the rails;

DETAILED DESCRIPTION

Figure 1:
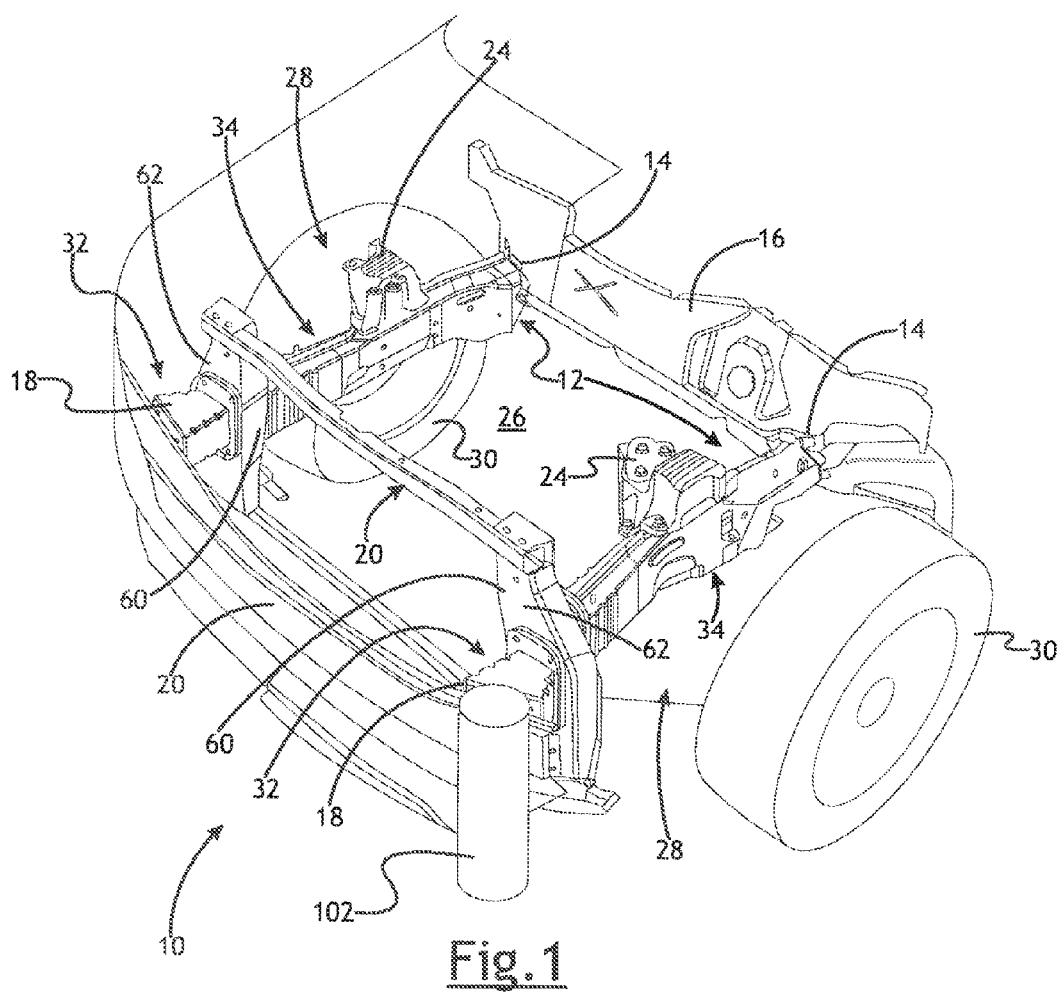
FIG. 1 is a perspective view of a portion of a front end of a vehicle, showing a front end module, front vehicle wheels and two angled rails of the vehicle structural assembly.

Referring in more detail to the drawings, FIG. 1 illustrates part of a vehicle front end 10 having a pair of angled rails 12 that define part of the vehicle structural assembly. The rails 12 may extend from a rear end 14 adapted to be coupled to another frame component, such as a dash panel, and to a front end 18 that may be coupled to a vehicle bumper 20 that may include a beam and a fascia, as desired. The rails 12 may be integrated or coupled with a front end module 22 to which a radiator and other components may be connected. The rails 12 may also be fitted with brackets or mounts 24 for the vehicle engine, which is received generally between the rails. Hence, the rails 12 may define part of an engine compartment 26 along and between at least part of their inboard facing sides. And outboard sides of the rails 12 may define or extend along part of a wheel envelope or well 28 in which the vehicle front wheels 30 are located. The wheels 30 extend generally in the fore-aft direction which extends from the front of the vehicle toward the rear of the vehicle (as distinguished from a cross-car direction that extends between driver and passenger sides of the vehicle).

As shown in FIGS. 1-4, the rails 12 may be spaced apart in the cross-car direction with one rail located on each of two opposed sides (e.g. left and right) of the engine compartment 26. The rails 12 may be mirror images of each other and may be constructed in the same manner and include the same components and features, so only one rail will be primarily described further.

The rail 12 may include a front portion 32 and a main body 34. The main body 34 may be defined by one or more plates or pieces of material suitable for use in a vehicle in the manner set forth herein, for example, steel or aluminum. The main body 34 may be formed in one piece or multiple pieces. In at least some implementations, the main body 34 is defined in multiple pieces and includes an inboard or first portion 36 adjacent to the engine compartment 26 and an outboard or second portion 38 facing away from the engine compartment. In combination, the inboard and outboard portions 36, 38 define an upper wall 40 and a lower wall 42 that are joined together by inner and outer side walls 44, 46. The inner side wall 44 is adjacent to and faces the engine compartment 26 and the outer side wall 46 faces away from the engine compartment 26 and toward and adjacent side of the vehicle. The walls 40-46 may define and extend from a first or rear end 14 of the rail 12 and may extend to a front end 48 of the main body 34 located closer to the front bumper 20 than the rear end 14. In the example shown, the inboard portion 36 defines the inner side wall 44 and a portion of both the upper wall 40 and lower wall 42, and the outboard portion 38 defines the outer side wall 46 and a portion of both the upper wall 40 and lower wall 42. Of course, other arrangements are possible. For example without limitation, the main body 34 may be defined by upper and lower portions instead of inboard and outboard portions, the main body may be formed in one piece, and the main body may be formed by more than two pieces.

Figure 6:
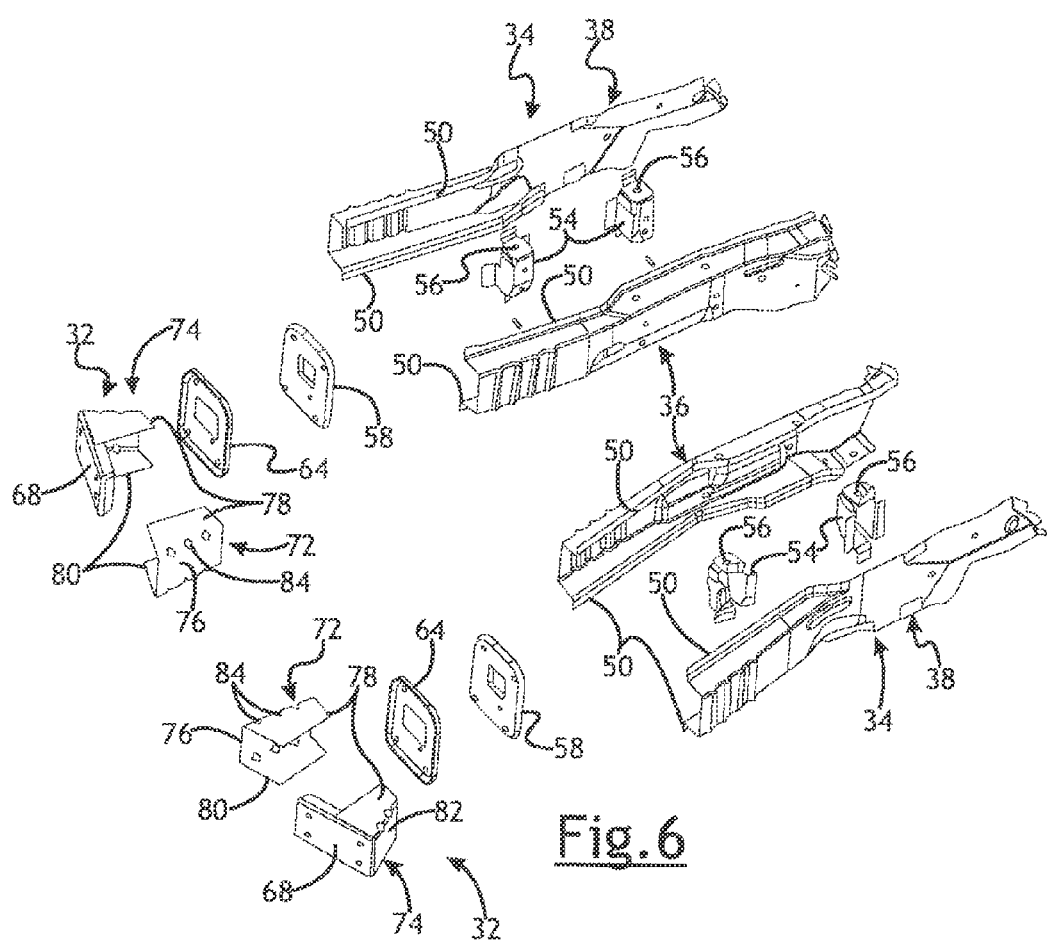
FIG. 6 is an exploded perspective view of the rails.

The inboard and outboard portions 36, 38 may be joined in any suitable manner, including by way of a couple examples, fasteners or welding. In the example shown, the inboard and outboard portions 36, 38 of the main body 34 are joined by welding along a junction that includes an upstanding flange 50 that extends along at least a portion of the interface between the rail portions 36, 38. Between the ends 14, 18 of the rail 12, one or more openings 52 may be provided to receive fasteners for one or more engine mounts 24 that are coupled to the rails and to the engine, to support the engine. To provide further support for the rails 12, one or more supports 54 (FIG. 6) or brackets may be received between the inboard and outboard portions 36, 38 of the rails 12, and may include openings 56 aligned with the openings 52 and designed to receive the engine mount fasteners therein or therethrough. The supports 54 may extend from the upper wall 40 to the lower wall 42, if desired, and along any desired length of the main body 34. In the example shown, two openings 52 are provided in the main body 34 and two supports 54 are provided within the main body 34, with one support aligned with each opening.

The main body 34 may extend generally longitudinally (fore-aft) from a first end which may be the rear end 14 to a second end which may be the front end 48. In the example shown, the front end 48 of the main body 34 terminates at or is coupled to a first mounting plate 58. The mounting plate 58 may be generally flat, planar and arranged perpendicularly to the longitudinal length of the rail 12 and provide an enlarged surface for connection of the main body 34 to a vehicle component (in this example, the front end module 22, specifically, a vertically oriented support 60 (FIG. 1) of the front end module 22). The plate 58 may be welded or otherwise connected to the main body 34 and is preferably connected to both portions 36, 38 of the main body. A second mounting plate 64 may be arranged opposite to the first mounting plate 58, also generally perpendicular to the longitudinal length of the main body 34. The second mounting plate 64 may be coupled to the energy absorbing front portion 32 of the rail 12, such as by welding, and may include one or more connection features, such as openings, through which fasteners may be received in assembly to couple the front portion 32 to the remainder of the rail 12 and to the front end module 22.

In at least some implementations, the first mounting plate 58 is coupled to one side of the front end module 22 and another portion of the rail is connected to the second mounting plate 64 that is coupled to an opposite side of the front end module 22. This divides the rail 12 into a forward portion between the front end module 22 and the bumper 20 and a rearward portion between the front end module 22 and the rear end 14 of the rail. Of course, other constructions and arrangements may be used. For example, without limitation as to other possibilities, the front end module 22 may include an opening through which a portion of the rail 12 extends and the mounting plate 58 may include connection features, such as openings, through which fasteners may be received in assembly, or the mounting plate 58 may include other connection features for connection of the plate to the front end module, such as at a forward facing surface 62 (FIG. 1) of the front end module, generally facing the front bumper 20.

As noted above, in addition to the main body 34 the rail 12 may also include a front portion 32 sometimes called a crush can. The crush can 32 may be adapted to crumple or deform to absorb energy and reduce energy transmission to the main body 34 of the rail 12 and to components connected to the rail. The crush can 32 may have a front end 66 connected to or near the front bumper 20 (and also defining the second end 18 of the rail) and a rear end 67 connected to the second mounting plate 64 (and/or may be considered to include the second mounting plate) and generally extends longitudinally between the front bumper 20 and the front end module 22. To this end, the crush can 32 may define the front end 18 of the rail adapted for connection to the bumper 20, such as by being provided with an end plate 68 having openings through which threaded fasteners may be received. The crush can 32 has a body 70 which may be defined in one or more than one piece. In the example shown, the body 70 includes three pieces with the end plate 68 defining the front end 66 and two intermediate portions 72, 74 coupled to one or more of the end plate 68, the second mounting plate 64 and each other.

The intermediate portions 72, 74 may be generally U-shaped and oppositely facing so that in assembly they define a hollow interior of the crush can 32 along with the end plate 68 and the second mounting plate 64. One intermediate portion 72 defines an inner side wall 76 that is generally in the same orientation as the inner side wall 44 of the main body 34, and also defines a portion of the upper and lower walls 78, 80 of the crush can 32. The other intermediate portion 74 defines an outer side wall 82 that is generally in the same orientation as the outer side wall 46 of the main body 34, and also defines a portion of the upper and lower walls 78, 80 of the crush can. Of course, other arrangements are possible (e.g. as set forth with regard to the main body). The intermediate portions 72, 74 may include energy absorbing features 84, such as weakened or non-linear portions arranged so that the crush can crumples or otherwise deforms longitudinally under load, generally in a predetermined manner, to absorb energy by such deformation and reduce energy transmitted to the remainder of the rail 12 and components to which the rail is connected. In the example shown, the intermediate portions 72, 74 include notches or cavities spaced apart along outer edges of the intermediate portions. The energy absorbing portions 84 may be provided in other ways, such as by slots through the walls of the intermediate portions, by beading, folds or bends in the walls, or otherwise as desired.

In at least some implementations, the main body 34 of each rail is not straight along its longitudinal length and is instead bent to orient a forward portion 86 of the main body at an angle to a rearward portion 88 of the main body (FIG. 2). The forward portion 86 may be defined between the front end 48 of the main body and a bend 90 formed between the rear and front ends 14, 48 of the main body 34. The rearward portion 88 may be defined between the rear end 14 and the bend 90. The forward portion 86 may be outwardly angled relative to the rearward portion 88 of the rail. By outwardly angled it is meant that the forward portion 86 is angled laterally away from the engine compartment 26 and toward the adjacent side of the vehicle or in the direction of the adjacent wheel 30 or wheel well 28 (in the cross-car direction). An included angle α (FIG. 4) of less than 180 degrees is thus provided in the outer side wall 46. Hence, with two rails 12 spaced on either side of the engine compartment 26, the forward portions 86 of the two rails 12 diverge away from each other. In the example shown, the flange 50 protrudes upwardly from the portions 36, 38 of the main body 34 in the area of the bend 90 and continues along the main body 34 to the front end 48 of the main body 34 attached to the first mounting plate 58. The flange 50 may begin at the outer side wall 46 of the main body 34 and angle inwardly to a center of the main body 34 so that the flange 50 is oriented along a centerline 92 (FIG. 2) of the forward portion 86. In at least some implementations, the centerline 92 of the forward portion 86 of the main body 34 may be provided at an angle of between about 3 degrees and 20 degrees relative to a centerline 94 of the rearward portion 88 of the main body.

The main body 34 may include energy absorbing features 96 such as weakened areas or other non-linear features on either side of the flange 50 and/or including the flange, to provide a desired deformation or crumple of the rail (e.g. longitudinal shortening) under sufficient force, to absorb in the rail 12, rather than transmit to other components, at least some energy. In the example shown, the energy absorbing features 96 of the main body 34 include spaced apart and vertically extending beads or accordion like folds that are designed to compress or crumple during a vehicle impact of sufficient magnitude, and these areas are provided between the front end 48 of the main body 34 and the bend 90, although they could be provided elsewhere instead or in addition to the noted location.

Figure 4:
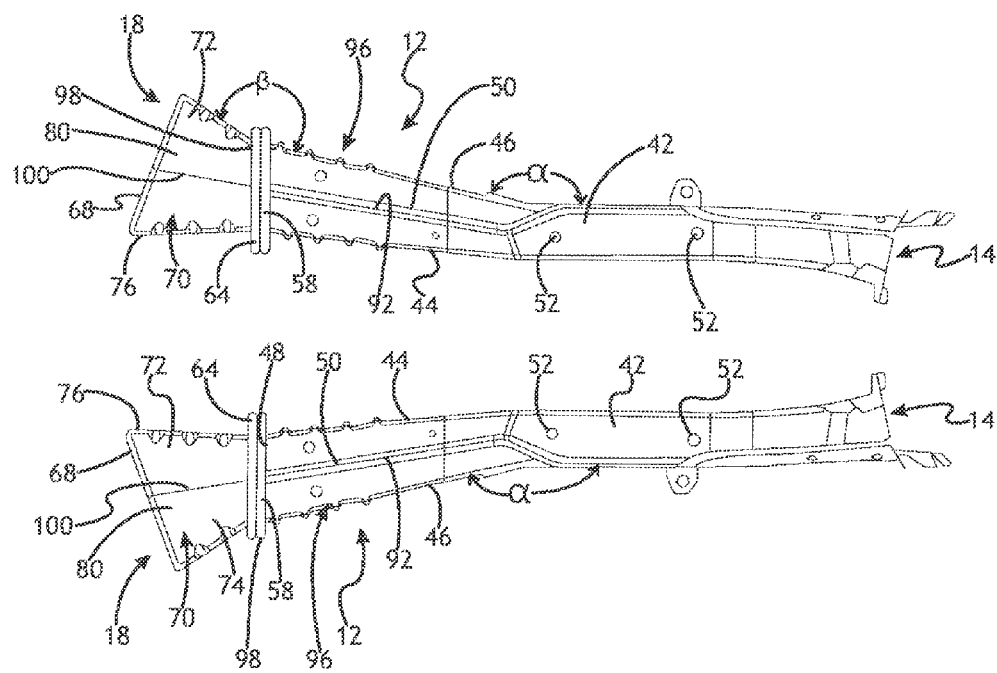
FIG. 4 is a bottom view of the rails.
Figure 5:
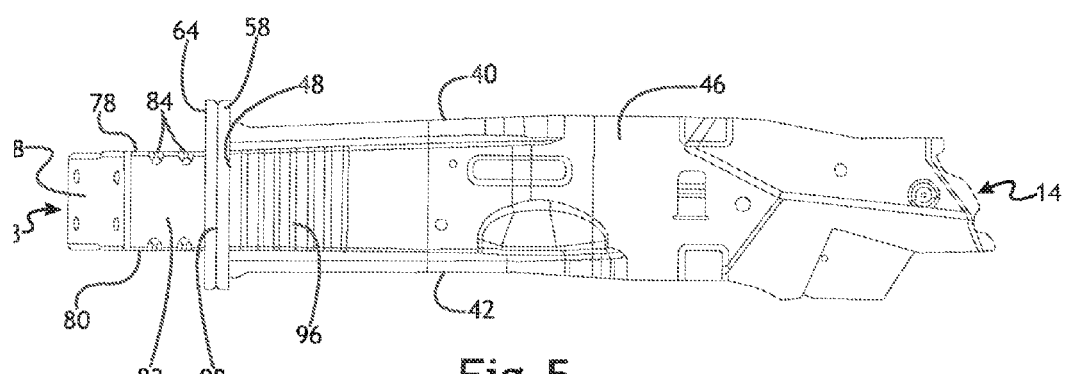
FIG. 5 is a side view of the rails.

In addition to the bend 90 in the main body 34, the crush cans 32 may be oriented at an angle to the front end 48 of the main body 34 by a second bend 98 (FIGS. 4 and 5). That is, at least a portion of the crush cans 32 may be angled outwardly relative to the front end 48 of the main body 34, so that the end plate 68 of the crush can 32 is at an increased outward angle relative to the rear end 14 of the main body 34. This provides additional outward structural support for the front bumper 20 while providing desired support for the engine and other front-end vehicle components. In the example shown, the outer side wall 82 of the crush can 32 is inclined at a greater angle to the forward portion 86 of the main body 34 than is the inner side wall 76 of the crush can 32, although other arrangements may be used as desired. In other words, the second bend 98 defines an included angle β (FIG. 4) of less than 180 degrees between the outer side wall 46 of the main body forward portion 86 and the outer side wall 82 of the crush can 32.

The orientation of the crush can 32 may be chosen to provide a centerline 100 (FIGS. 2 and 4) of the crush can 32 oriented with an obstacle 102 (FIG. 1) offset from the center of the front bumper 20 by 20% or more of the vehicle's width, such as the obstacle in a so-called small overlap barrier test performed by the Insurance Institute for Highway Safety. The centerline 100 of the crush can 32 may also be aligned with or intersect a line extending through the center of the flange 50 in the main body 34, so that forces from the impact with such an obstacle are more-or-less uniformly distributed through the crush can 32 and main body 34 for effective energy absorption and dissipation in the vehicle, while also providing similar benefits for other collisions at the front end of the vehicle.

Hence, the rail 12 may be considered to have bends 90, 98 at two locations, in the example shown, these bends 90, 98 are arranged one between the ends 14, 48 of the main body 34 and one between the main body 34 and at least a portion of the crush can 32. Both bends 90, 98 angle portions of the rail 12 that extend outwardly or are inclined in a cross-car direction from a location more centrally located within the vehicle to a location closer to an exterior side of the vehicle to provide a rail that has a first portion (e.g. rearward portion 88) between a wheel well 28 and engine compartment 26 and a second portion (e.g. forward portion 86) that is forward of the wheel well 28 but overlaps the wheel well 28 in the cross-car direction. In other words, a rear portion inwardly spaced from the wheel well 28 and a forward portion aligned with or overlapping the wheel well 28 in the cross-car direction and between the front bumper 20 and wheel well 28.

Additionally, the energy absorbing, forward portion or crush can 32 of the rail 12 may have a cross sectional area that increases from the rear end adjacent to the second mounting plate 64 to the front end 66 adjacent to the front bumper 20. In at least some implementations, the cross sectional area is between 30% and 150% larger at the front end than at the rear end. Also in at least some implementations, the increase in cross-sectional area is due at least in part to the side walls 76, 82 diverging from the rear end to the front end of the can 32. An angle γ between the side walls 76, 82 of the can 32 may be between 3 and 45 degrees. In the example shown, the inner side wall 76 is generally at the same angle as the inner side wall 44 of the forward portion 86 of the main body 34 and the outer side wall 82 of the crush can 32 diverges relative to the inner side wall 76. Of course, either or both side walls 76, 82 may be at an angle greater than about 5 degrees relative to the corresponding side wall 44, 46 of the main body 34.

What is claimed is:

1. A structural rail for a vehicle, comprising:
a main body having a first end and a second end and a longitudinal length between the first end and the second end, an upper wall extending at least partially between the first end and the second end, a lower wall extending at least partially between the first end and the second end, an inner sidewall extending between the upper wall and the lower wall, and an outer sidewall extending between the upper wall and the lower wall and laterally spaced from the inner sidewall,
a front portion having a rear end adjacent to the second end of the main body and a front end longitudinally spaced from the rear end, wherein the main body has a first bend between the first end and second end so that the main body between the first bend and the second end is angled outwardly and an included angle of less than 180 degrees is provided in the outer sidewall, and the rail has a second bend between the first bend and the front end, and the second bend further angles at least part of the front portion outwardly relative to the outwardly angled portion of the main body.

2. The rail of claim 1 wherein the front portion includes an inner sidewall generally aligned within the inner sidewall of the main body, and the front portion includes an outer sidewall generally aligned with the outer sidewall of the main body, and wherein the second bend defines an included angle of less than 180 degrees between the outer sidewall of the front portion and the outer sidewall of the main body.

3. The rail of claim 1 wherein the front portion is tapered so that the front portion has a greater cross-sectional area at the front end than at the rear end.

4. The rail of claim 1 wherein the front portion includes one or more energy absorbing features arranged to permit longitudinal deformation of the front portion.

5. The rail of claim 4 wherein the main body includes one or more energy absorbing features arranged to permit longitudinal deformation of at least part of the main body.

6. The rail of claim 1 wherein the main body includes an inboard portion defining the inner sidewall, and the main body includes an outboard portion defining the outer sidewall, and wherein the inboard portion and outboard portion are coupled together at a junction that extends along a center of the main body between the first bend and the second end of the main body.

7. The rail of claim 6 wherein the junction includes an upstanding flange and the inboard portion and outboard portion are welded at the flange.

8. The rail of claim 1 which also includes a first mounting plate coupled to the main body and extending generally perpendicularly to the main body and which also includes a second mounting plate coupled to the front portion and wherein the first mounting plate and second mounting plate are each coupled to the same vehicle component in assembly.

9. A structural assembly for a vehicle having an engine within an engine compartment and a wheel within a wheel well, the rail assembly comprising:
   a main body having a rear end adapted to be coupled to a vehicle structural member and a front end adapted to be coupled to a vehicle bumper, the main body being hollow and having an inner side that extends along the engine compartment of the vehicle and an outer side that extends along the vehicle wheel well, the inner side and the outer side being defined in separate pieces of material that are connected together; and
   a crush can having a front end near the vehicle bumper and a rear end adjacent to the front end of the main body, wherein the main body has a first bend between the front end and rear end so that the main body between the first bend and the front end is angled outwardly away from the engine compartment, and a second bend is provided between the first bend and the crush can front end, and wherein the second bend further angles at least part of the crush can outwardly away from the engine compartment.

10. The rail of claim 9 wherein the first bend defines an included angle $\alpha$ of less than 180 degrees in the outboard side of the main body facing the wheel well and between the front end and the rear end of the main body.

11. The rail of claim 9 wherein the crush can includes an outer sidewall facing away from the engine compartment, and the main body includes an outer sidewall generally aligned within the outer sidewall of the crush can, and wherein the second bend defines an included angle ($\beta$) of less than 180 degrees between the outer sidewall of the crush can and the outer sidewall of the main body.

12. The rail of claim 9 wherein the crush can has a rear end adjacent to the main body and extends to a front end spaced from the rear end of the crush can, and wherein the crush can is tapered so that the front end of the crush can has a greater cross-sectional area than the rear end of the crush can.

13. The rail of claim 9 wherein the crush can includes one or more energy absorbing features arranged to permit longitudinal deformation of the front portion between the second bend and a front end of the crush can and the main body includes one or more energy absorbing features arranged to permit longitudinal deformation of the main body between the first bend and the second bend.

14. The rail of claim 9 wherein the main body includes an inboard portion defining the inner sidewall, and the main body includes an outboard portion defining the outer sidewall, and wherein the inboard portion and outboard portion are coupled together at a junction that extends along a center of the main body between the first bend and the second end of the main body.

15. The rail of claim 14 wherein the junction includes an upstanding flange and the inboard portion and outboard portion are welded at the flange.

16. The rail of claim 9 which also includes a first mounting plate coupled to the main body and extending generally perpendicularly to the main body and which also includes a second mounting plate coupled to the crush can and wherein the first mounting plate and second mounting plate are each coupled to the same vehicle component in assembly.

* * * * *